United States Patent
Kim et al.

(10) Patent No.: US 10,214,642 B2
(45) Date of Patent: Feb. 26, 2019

(54) THERMOPLASTIC RESIN COMPOSITION AND MOLDED ARTICLE MANUFACTURED THEREFROM

(71) Applicant: LG CHEM, LTD., Seoul (KR)

(72) Inventors: Tea Hyun Kim, Daejeon (KR); Tae Hoon Kim, Daejeon (KR); Seong Lyong Kim, Daejeon (KR); In Hyeok Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 97 days.

(21) Appl. No.: 15/535,384

(22) PCT Filed: Nov. 22, 2016

(86) PCT No.: PCT/KR2016/013501
§ 371 (c)(1),
(2) Date: Jun. 14, 2017

(87) PCT Pub. No.: WO2017/095060
PCT Pub. Date: Jun. 8, 2017

(65) Prior Publication Data
US 2018/0265690 A1    Sep. 20, 2018

(30) Foreign Application Priority Data

Nov. 30, 2015 (KR) .................. 10-2015-0168855

(51) Int. Cl.
| *C08L 33/12* | (2006.01) |
| *C08K 3/00* | (2018.01) |
| *C08K 5/00* | (2006.01) |
| *C08L 51/04* | (2006.01) |
| *C08J 3/00* | (2006.01) |
| *C08J 5/00* | (2006.01) |
| C08L 25/14 | (2006.01) |
| C08G 77/42 | (2006.01) |

(52) U.S. Cl.
CPC ............. *C08L 33/12* (2013.01); *C08J 3/005* (2013.01); *C08J 5/00* (2013.01); *C08K 3/00* (2013.01); *C08K 5/00* (2013.01); *C08L 51/04* (2013.01); *C08G 77/42* (2013.01); *C08J 2333/12* (2013.01); *C08J 2425/12* (2013.01); *C08J 2425/14* (2013.01); *C08J 2433/12* (2013.01); *C08J 2443/04* (2013.01); *C08J 2451/04* (2013.01); *C08J 2467/00* (2013.01); *C08J 2483/10* (2013.01); *C08L 25/14* (2013.01); *C08L 2201/08* (2013.01); *C08L 2205/025* (2013.01); *C08L 2205/03* (2013.01); *C08L 2205/035* (2013.01)

(58) Field of Classification Search
CPC combination set(s) only.
See application file for complete search history.

(56) References Cited

U.S. PATENT DOCUMENTS

| 4,731,414 | A | 3/1988 | Ting | |
| 9,469,759 | B2 * | 10/2016 | Chung | ............ C08L 33/10 |
| 2006/0069208 | A1 * | 3/2006 | Dhawan | .......... C08F 265/04 525/191 |
| 2006/0148992 | A1 * | 7/2006 | Kim | .............. C08F 265/04 525/238 |
| 2014/0187719 | A1 * | 7/2014 | Kim | .............. C08L 69/00 525/74 |
| 2015/0183974 | A1 * | 7/2015 | Chae | ............ C08L 33/12 523/122 |
| 2015/0299450 | A1 * | 10/2015 | Ryu | .............. C08L 9/06 525/57 |
| 2017/0292019 | A1 * | 10/2017 | Lee | .............. C08G 64/24 |

FOREIGN PATENT DOCUMENTS

| KR | 10-2004-0105464 A | 12/2004 |
| KR | 10-2007-0072892 A | 7/2007 |
| KR | 10-2014-0005510 A | 1/2014 |
| KR | 10-2015-0047991 A | 5/2015 |
| KR | 10-2015-0067573 A | 6/2015 |
| WO | WO 2014/007442 A1 | 1/2014 |

OTHER PUBLICATIONS

Machine translation of KR 20150067573.*
Machine translation of KR 20150047991.*
Extended European Search Report for European Application No. 16870956.6 dated May 29, 2018.
International Search Report for International Patent Application No. PCT/KR2016/013501, filed Nov. 22, 2016.

* cited by examiner

*Primary Examiner* — Marc S Zimmer

(57) ABSTRACT

The present disclosure relates to a thermoplastic resin composition and a molded article manufactured therefrom. More particularly, in accordance the present disclosure, a thermoplastic resin composition exhibiting superior colorability, fluidity, scratch resistance, heat resistance, and weatherability and a molded article manufactured therefrom are provided.

19 Claims, No Drawings

THERMOPLASTIC RESIN COMPOSITION AND MOLDED ARTICLE MANUFACTURED THEREFROM

TECHNICAL FIELD

Cross-Reference to Related Application(S)

This application is a U.S. National Stage of International Application No. PCT/KR2016/013501, filed on Nov. 22, 2016, which claims the priority benefit of Korean Patent Application No. 10-2015-0168855, filed on Nov. 30, 2015 in the Korean Intellectual Property Office, the disclosure of which is incorporated herein by reference.

The present disclosure relates to a thermoplastic resin composition and a molded article manufactured therefrom, more particularly to a thermoplastic resin composition exhibiting superior colorability, fluidity, scratch resistance, heat resistance, and weatherability and a molded article manufactured therefrom.

BACKGROUND ART

Recently, electric and electronic products are required to have high housing quality as well as superior performance. Accordingly, research into materials that allow superior mechanical properties, such as superior scratch resistance and impact strength, and improvement of emotional quality related to appearance characteristics, such as gloss and black impression, of a product housing is actively underway.

With regard to this, an acrylonitrile-butadiene-styrene (hereinafter referred to as "ABS") copolymer, an ABS resin, is considered as a representative resin having both functionality and versatility and provides superior impact strength, tensile strength, elastic modulus, flame resistance, and the like. Accordingly, an ABS resin is widely used as a material for automobile components, various electric and electronic components, and the like. However, such an ABS resin is easily scratched during injection molding or in use and has difficulty in expressing high-quality color. In addition, when an ABS resin is exposed to UV rays for a certain period or more, the double bonds of butadiene rubber are decomposed by oxygen in the air, ozone, light, and the like, and thus, discoloration easily occurs. Accordingly, an ABS resin has a drawback such as poor weatherability.

To overcome such disadvantages of an ABS resin, surfaces of products are generally painted or coated. However, such painting or coating method entails subsequent processes, which results in productivity decrease problems such as complicated operation and an increase in a defect rate. In addition, it is difficult to recycle products manufactured therefrom.

Meanwhile, as scratch resistant-materials not requiring processes such as painting, coating, and the like, polymethyl methacrylate (hereinafter referred to as "PMMMA"), an acrylic resin, and the like providing superior colorability and gloss are mainly used. However, a PMMA resin exhibits low impact resistance and poor injection moldability. In addition, when a scratch resistant-material, a methyl methacrylate-acrylonitrile-butadiene-styrene resin (hereinafter referred to as "transparent ABS resin"), is used, colorability, gloss, impact resistance, and the like are satisfactory, but hardness and flexural modulus are poor. Accordingly, problems, such as scratch resistance decrease and deformation during molding, may occur.

Therefore, there is an urgent need for a resin that provides superior colorability, fluidity, scratch resistance, heat resistance, and weatherability.

RELATED ART DOCUMENT

[Patent Document] KR 10-2004-0105464 A

DISCLOSURE

Technical Problem

Therefore, the present invention has been made in view of the above problems, and it is one object of the present invention to provide a thermoplastic resin composition exhibiting superior colorability, fluidity, scratch resistance, heat resistance, and weatherability and a molded article manufactured therefrom.

The above and other objects can be accomplished by the present disclosure described below.

Technical Solution

In accordance with one aspect of the present invention, provided is a thermoplastic resin composition that includes 7 to 50% by weight of an acrylic rubber-aromatic vinyl compound-vinyl cyan compound graft copolymer (a); 7 to 40% by weight of a silicone-acrylate based copolymer (b); 5 to 20% by weight of a (meth)acrylic acid alkyl ester compound-aromatic vinyl compound-vinyl cyan compound copolymer (c); 30 to 75% by weight of a total (d) of a highly heat-resistant (meth)acrylic acid alkyl ester polymer (d-1) having a heat resistance of greater than 91° C. and a flow index (230° C., 3.8 kg) of 1 g/10 min to 5 g/10 min and a high-fluidity (meth)acrylic acid alkyl ester polymer (d-2) having a heat resistance of 91° C. or less and a flow index of greater than 5 g/10 minutes; and 0 to 5% by weight of a (meth)acrylic acid alkyl ester compound-aromatic vinyl compound-acid anhydride copolymer (e) and thus exhibits superior colorability, fluidity, scratch resistance, heat resistance, and weatherability and a method of preparing the thermoplastic resin composition.

In accordance with another aspect of the present invention, provided is a molded article manufactured from the thermoplastic resin composition.

Advantageous Effects

As apparent from the fore-going, the present invention advantageously provides a thermoplastic resin composition exhibiting superior colorability, scratch resistance, fluidity, heat resistance, and weatherability and a molded article manufactured therefrom.

BEST MODE

Hereinafter, the present invention is described in detail.

A thermoplastic resin composition of the present disclosure includes 7 to 50% by weight of an acrylic rubber-aromatic vinyl compound-vinyl cyan compound graft copolymer (a); 7 to 40% by weight of a silicone-acrylate based copolymer (b); 5 to 20% by weight of a (meth)acrylic acid alkyl ester compound-aromatic vinyl compound-vinyl cyan compound copolymer (c); 30 to 75% by weight of a total (d) of a highly heat-resistant (meth)acrylic acid alkyl ester polymer (d-1) having a heat resistance of greater than 91° C. and a flow index (230° C., 3.8 kg) of 1 g/10 min to 5 g/10 min and a high-fluidity (meth)acrylic acid alkyl ester polymer (d-2) having a heat resistance of 91° C. or less and a flow index of greater than 5 g/10 minutes; and 0 to 5% by weight of a (meth)acrylic acid alkyl ester compound-aromatic vinyl compound-acid anhydride copolymer (e). Within this range, superior colorability, scratch resistance, fluidity, heat resistance, and weatherability are provided.

Hereinafter, the ingredients constituting the thermoplastic resin composition of the present disclosure are described in detail.

Acrylic Rubber-Aromatic Vinyl Compound-Vinyl Cyan Compound Graft Copolymer (a)

The graft copolymer (a) may be included in an amount of, for example, 7 to 40% by weight, or 10 to 30% by weight. Within this range, superior colorability is exhibited.

The graft copolymer (a) may include, for example, an acrylic rubber-aromatic vinyl compound-vinyl cyan compound graft copolymer (a-1), in which the acrylic rubber has an average particle diameter of 500 to 2000 Å, and an acrylic rubber-aromatic vinyl compound-vinyl cyan compound graft copolymer (a-2), in which the acrylic rubber has an average particle diameter of 2500 to 6000 Å. In this case, superior impact strength, gloss, and property balance are exhibited.

The graft copolymer (a-1) may be prepared by polymerizing, for example, 5 to 70% by weight of an acrylic rubber, 10 to 70% by weight of an aromatic vinyl compound, and 1 to 25% by weight of a vinyl cyanide compound; or 20 to 60% by weight of an acrylic rubber, 25 to 60% by weight of an aromatic vinyl compound, and 5 to 20% by weight of a vinyl cyanide compound. Within this range, superior gloss and property balance are exhibited.

The graft copolymer (a-2) may be prepared by polymerizing, for example, 10 to 70% by weight of an acrylic rubber, 10 to 60% by weight of an aromatic vinyl compound, and 1 to 30% by weight of a vinyl cyanide compound; or 25 to 60% by weight of an acrylic rubber, 20 to 50% by weight of an aromatic vinyl compound, and 5 to 25% by weight of a vinyl cyanide compound. Within this range, superior impact strength and property balance are exhibited.

A weight ratio of the graft copolymer (a-1):the graft copolymer (a-2) may be, for example, 1:9 to 9:1, or 3:7 to 7:3. Within this range, superior impact strength, gloss, and property balance are exhibited.

The acrylic rubber may be prepared by emulsion-polymerizing an acrylate monomer with additives such as an emulsifier, an initiator, a grafting agent, a crosslinking agent, and an electrolyte.

Silicone-Acrylate Based Copolymer (b)

The copolymer (b) may be included in an amount of, for example, 10 to 30% by weight, or 10 to 25% by weight. Within this range, superior colorability and scratch resistance are exhibited.

The copolymer (b) may b, for example, a copolymer formed by graft-polymerizing one or more selected from the group consisting of a silicone rubber, a silicone-acrylate based rubber, and a mixture thereof, which is used to prepare a core, with one or more selected from the group consisting of an aromatic vinyl compound, a vinyl cyan compound, and a (meth)acrylic acid alkyl ester compound, which is used to prepare a shell.

The acrylate based rubber may be, for example, one or more selected from the group consisting of butyl acrylate rubber, 2-ethylhexyl acrylate rubber, a butyl acrylate-styrene copolymer, and a 2-ethylhexyl acrylate-acrylonitrile copolymer.

(Meth)Acrylic Acid Alkyl Ester Compound-Aromatic Vinyl Compound-Vinyl Cyan Compound Copolymer (c)

The copolymer (c) may be included in an amount of, for example, 5 to 15% by weight, or 5 to 10% by weight. Within this range, superior colorability is exhibited.

The copolymer (c) may be prepared by polymerizing, for example, 40 to 80% by weight of a (meth)acrylic acid alkyl ester compound, 10 to 40% by weight of an aromatic vinyl compound, and 1 to 20% by weight of a vinyl cyan compound; or 50 to 70% by weight of a (meth)acrylic acid alkyl ester compound, 20 to 35% by weight of an aromatic vinyl compound, and 5 to 15% by weight of a vinyl cyan compound. Within this range, superior colorability is exhibited.

The (meth)acrylic acid alkyl ester compound may be, for example, methacrylic acid alkyl ester, acrylic acid alkylester, or a mixture thereof.

(Meth)Acrylic Acid Alkyl Ester Polymer (d)

The polymer (d) may be included in an amount of, for example, 40 to 70% by weight, or 50 to 65% by weight. Within this range, superior scratch resistance is exhibited with maintenance of colorability and heat resistance.

The polymer (d) may b, for example, one or more selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester.

The polymer (d) may be, for example, a mixture of a highly heat-resistant (meth)acrylic acid alkyl ester polymer (d-1) and a high-fluidity (meth)acrylic acid alkyl ester polymer (d-2).

A weight ratio of the polymer (d-1):polymer (d-2) may be, for example, 1:9 to 9:1, or 3:7 to 7:3. Within this range, scratch resistance and fluidity further increase.

The highly heat-resistant (meth)acrylic acid alkyl ester polymer (d-1) may have, for example, a heat resistance at greater than 91° C., or 92 to 120° C. and a flow index (230° C., 3.8 kg) of 1 to 5 g/10 min, or 1 to 3 g/10 min.

The high-fluidity (meth)acrylic acid alkyl ester polymer (d-2) may have, for example, a heat resistance at 91° C. or less, or 80 to 91° C. and a flow index (230° C., 3.8 kg) of greater than 5 g/10 minutes, 7 g/10 minutes or more, or 7 g/10 min to 20 g/10 min.

A weight ratio of the copolymer (c):the polymer (d) may be, for example, 5 to 30:70 to 95, or 7 to 20:80 to 93. Within this range, superior colorability, fluidity, and weatherability are exhibited.

(Meth)Acrylic Acid Alkyl Ester Compound-Aromatic Vinyl Compound-Acid Anhydride Copolymer (e)

The copolymer (e) may be included in an amount of, for example, 1 to 4% by weight, or 2 to 4% by weight. Within this range, heat resistance increases.

The copolymer (e) may be prepared by polymerizing, for example, 15 to 30% by weight of a (meth)acrylic acid alkyl ester compound, 60 to 80% by weight of an aromatic vinyl compound, and 1 to 15% by weight of an acid anhydride; or 20 to 25% by weight of a (meth)acrylic acid alkyl ester compound, 65 to 75% by weight of an aromatic vinyl compound, and 5 to 10% by weight of an acid anhydride. Within this range, superior heat resistance is exhibited.

The acid anhydride may be, for example, one or more selected from the group consisting of maleic anhydride, itaconic anhydride, and citraconic anhydride.

Siloxane-Polyester Copolymer (f)

The copolymer (f) may be included in an amount of, for example, 0.1 to 5 parts by weight, 1 to 4 parts by weight, or 2 to 3 parts by weight based on 100 parts by weight of the thermoplastic resin composition. Within this range, superior scratch resistance is exhibited.

The thermoplastic resin composition may further include, for example, one or more selected from the group consisting of an antimicrobial agent, a heat stabilizer, an antioxidant, a releasing agent, a light stabilizer, an inorganic additive, a surfactant, a coupling agent, a plasticizer, a compatibilizer, a lubricant, an antistatic agent, a colorant, a pigment, a dye, a flame retardant, an auxiliary flame retardant, an anti-dripping agent, a weathering-resistant agent, an ultraviolet absorber, and a sunscreen.

The thermoplastic resin composition may have a scratch resistance value, ΔL (brightness by color system CIE1976 L*a*b), of, for example, 2 or less, or 0.1 to 2.

The thermoplastic resin composition may have a heat deflection temperature of, for example, 82° C. or more, or 82 to 95° C.

The thermoplastic resin composition may have a flow index (220° C., 10 kg) of, for example, 6 or more, 7 or more, or 7 to 25 according to ASTM D1238.

The thermoplastic resin composition may have a weatherability, for example, grade 4 or higher, or grades 4 to 5 according to gray scale for evaluating change in color.

The acrylic rubber of the present disclosure may be prepared by, for example, polymerizing an acrylate monomer. The acrylate monomer may be, for example, one or more selected from the group consisting of $C_2$ to $C_8$ alkyl acrylates, e.g., methyl acrylate, ethyl acrylate, propyl acrylate, isopropyl acrylate, t-butyl acrylate, n-butyl acrylate, n-octyl acrylate, 2-ethylhexyl acrylate, methyl methacrylate, ethyl methacrylate, propyl methacrylate, isopropyl methacrylate, t-butyl methacrylate, n-butyl methacrylate, n-octyl methacrylate, and 2-ethylhexyl methacrylate. Preferably, the acrylate monomer is n-butyl acrylate or n-butyl methacrylate.

The aromatic vinyl compound of the present disclosure may be one or more selected from the group consisting of, for example, styrene, α-methyl styrene, o-ethyl styrene, p-ethyl styrene, and vinyl toluene.

The vinyl cyan compound of the present disclosure may be one or more selected from the group consisting of, for example, acrylonitrile, methacrylonitrile, and ethacrylonitrile.

The (meth)acrylic acid alkyl ester compound of the present disclosure may be, for example, one or more selected from the group consisting of methyl methacrylate, n-butyl methacrylate, benzyl methacrylate, lauryl methacrylate, and stearyl methacrylate.

A method of preparing the thermoplastic resin composition of the present disclosure may include a step of melt-kneading 7 to 50% by weight of an acrylic rubber-aromatic vinyl compound-vinyl cyan compound graft copolymer (a); 7 to 40% by weight of a silicone-acrylate based copolymer (b); 5 to 20% by weight of a (meth)acrylic acid alkyl ester compound-aromatic vinyl compound-vinyl cyan compound copolymer (c); 30 to 75% by weight of a total (d) of a highly heat-resistant (meth)acrylic acid alkyl ester polymer (d-1) having a heat resistance of greater than 91° C. and a flow index (230° C., 3.8 kg) of 1 g/10 min to 5 g/10 min and a high-fluidity (meth)acrylic acid alkyl ester polymer (d-2) having a heat resistance of 91° C. or less and a flow index of greater than 5 g/10 minutes; and 0 to 5% by weight of a (meth)acrylic acid alkyl ester compound-aromatic vinyl compound-acid anhydride copolymer (e), followed by extrusion.

The melt-kneading may be carried out, for example, at 220 to 290° C., or 220 to 260° C.

In the method of preparing the thermoplastic resin composition, for example, a siloxane-polyester copolymer (f) may be included in an amount of 0.1 to 5 parts by weight, 1 to 4 parts by weight, or 2 to 3 parts by weight based on 100 parts by weight of the thermoplastic resin composition. Within this range, superior scratch resistance is exhibited.

The present disclosure provides a molded article manufactured from the thermoplastic resin composition.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

Example

Hereinafter, compounds used in the following examples and comparative examples are described.

ASA Graft Copolymer (a):

The ASA graft copolymer was prepared by emulsion-polymerizing a reaction mixture including an acrylic rubber, an aromatic vinyl compound, a vinyl cyanide compound, an emulsifier, a polymerization initiator, and a molecular weight regulator.

The graft copolymer (a) may include an acrylic rubber-aromatic vinyl compound-vinyl cyan compound graft copolymer (a-1), in which the acrylic rubber has an average particle diameter of 500 to 2000 Å, and an acrylic rubber-aromatic vinyl compound-vinyl cyan compound graft copolymer (a-2), in which the acrylic rubber has an average particle diameter of 2500 to 6000 Å. In this case, superior impact strength, gloss, and property balance are exhibited.

The graft copolymer (a-1) may be prepared by polymerizing 20 to 60% by weight of an acrylic rubber, 25 to 60% by weight of an aromatic vinyl compound, and 5 to 20% by weight of a vinyl cyanide compound. Within this range, superior gloss and property balance are exhibited.

The graft copolymer (a-2) may be prepared by polymerizing 25 to 60% by weight of an acrylic rubber, 20 to 50% by weight of an aromatic vinyl compound, and 5 to 25% by weight of a vinyl cyanide compound. Within this range, superior impact strength and property balance are exhibited.

A weight ratio of the graft copolymer (a-1):the graft copolymer (a-2) may be 3:7 to 7:3. Within this range, superior impact strength, gloss, and property balance are exhibited.

The acrylic rubber may be prepared by emulsion-polymerizing an acrylate monomer with additives such as an emulsifier, an initiator, a grafting agent, a crosslinking agent, and an electrolyte.

The method of preparing the ASA graft copolymer may be performed according to a method of preparing an ASA copolymer disclosed in KR 0694456 B1 (published on Apr. 26, 2006) previously filed by the present applicant.

Silicone-acrylate based copolymer (b): SX006 (manufactured by MRC)

Methacrylate-styrene-acrylonitrile copolymer (c): XT500 (manufactured by LG Chemical)

Highly heat-resistant PMMA resin (d-1): IH830C (having a flow index (230° C., 3.8 kg) of 2.0 g/10 min and a heat deflection temperature (18.6 kg) of 94° C., manufactured by LGMMA)

High-fluidity PMMA resin (d-2): HP210 (having a flow index (230° C., 3.8 kg) of 10.2 g/10 min and a heat deflection temperature (18.6 kg) of 91° C., manufactured by LGMMA)

SM-MMA-MAH copolymer (e): RESISFY R100 (manufactured by DENKA)

Siloxane-polyester copolymer (f): Tegomer H-si-6441P (manufactured by Evonik Degussa)

Examples 1 to 5 and Comparative Examples 1 to 6

Ingredients were added in amounts summarized in Tables 1 and 2 below and mixed by means of a mixer. Each of resultant mixtures was extruded by means of a twin-screw extruder at 220 to 260° C. and then prepared into a pellet shape. The resultant pellet was dried at 80° C. for four hours or more and then injection-molded, thereby preparing a specimen for property test. The resultant specimen was allowed to sit for 48 hours, and then was subjected to property measurement.

Test Example

The characteristics of thermoplastic resin compositions prepared according to each of Examples 1 to 5 and Comparative Examples 1 to 6 were measured according to the following methods. Results are summarized in Tables 1 and 2 below.

Colorability (color L): Measured by means of a color meter (Color-Eye 7000A, manufactured by GRETAG-MACBETH) according to a color system CIE1976 L*a*b. Here, L=100 refers to pure white, L=0 refers to pure black, and black impression is superior with decreasing L value.

Gray scale: Weatherability was measured according to the gray scale for evaluating change in color). Weatherability is superior with increasing gray scale.

Heat deflection temperature (C): Measured according to ASTM D648.

TABLE 1

| Classification | Example 1 | Example 2 | Example 3 | Example 4 | Example 5 |
|---|---|---|---|---|---|
| a (% by weight) | 20 | 15 | 15 | 20 | 10 |
| b (% by weight) | 10 | 15 | 20 | 15 | 20 |
| c (% by weight) | 10 | 10 | 5 | 10 | 10 |
| d-1 (% by weight) | 20 | 10 | 40 | 30 | 10 |
| d-2 (% by weight) | 40 | 50 | 20 | 25 | 50 |
| e (% by weight) | 0 | 3 | 0 | 3 | 0 |
| f (parts by weight) | 1.0 | 1.0 | 1.0 | 1.0 | 1.0 |
| Colorability (L) | 24.7 | 24.6 | 24.3 | 24.9 | 24.4 |
| Scratch resistance | $\Delta L < 2$ | $\Delta L < 2$ | $\Delta L < 2$ | $\Delta L < 2$ | $\Delta L < 2$ |
| MI | 10 | 13 | 7 | 9 | 15 |
| Gray scale | Grade 4 | Grade 4 | Grade 4 | Grade 4 | Grade 4 |
| Heat deflection temperature | 84 | 87 | 87 | 89 | 82 |

TABLE 2

| Classification | Comparative Example 1 | Comparative Example 2 | Comparative Example 3 | Comparative Example 4 | Comparative Example 5 | Comparative Example 6 |
|---|---|---|---|---|---|---|
| a (% by weight) | 30 | 15 | 20 | 10 | 40 | 5 |
| b (% by weight) | — | 20 | 15 | 20 | 30 | 5 |
| c (% by weight) | 10 | — | 10 | 70 | 5 | 10 |
| d-1 (% by weight) | 20 | 45 | 55 | — | 15 | 50 |
| d-2 (% by weight) | 40 | 20 | — | — | 10 | 30 |
| e (% by weight) | — | 0 | 3 | — | — | — |
| f (parts by weight) | 1.0 | 1.0 | 1.0 | 1.0 | 1.0 | 1.0 |
| Colorability (L) | 25.3 | 24.5 | 24.8 | 25.5 | 27.5 | 24.3 |
| Scratch resistance | $\Delta L = 4$ | $\Delta L < 2$ | $\Delta L < 2$ | $\Delta L = 4$ | $\Delta L = 5$ | $\Delta L < 2$ |
| MI | 10 | 4 | 3 | 25 | 5 | 20 |
| Gray scale | Grade 4 | Grade 4 | Grade 4 | Grade 4 | Grades 4 to 5 | Grade 2 |
| Heat deflection temperature | 83 | 89 | 87 | 77 | 72 | 90 |

Scratch resistance: ΔL (brightness by color system CIE1976 L*a*b) was measured according to the Erichsen test.

Flow index (MI; g/10 min): Measured at 220° C. under a load of 10 kg for 10 min according to ASTM D1238.

As shown in Tables 1 and 2, the thermoplastic resin compositions (Examples 1 to 5) according to the present disclosure exhibit superior colorability, scratch resistance, flow index, gray scale, and heat deflection temperature.

On the other hand, in the case of Comparative Example 1 in which the silicone-acrylate based copolymer (b) is not included, colorability and scratch resistance are decreased. In addition, in the cases of Comparative Example 2, in which the methacrylate styrene acrylonitrile copolymer (3) is not included, and Comparative Example 3, in which the high-fluidity PMMA resin (d-2) is not included, a flow index is greatly decreased. Further, in the case of Comparative Example 4 in which the highly heat-resistant PMMA resin (d-1) and the high-fluidity PMMA resin (d-2) are not included and the methacrylate-styrene-acrylonitrile copolymer (c) is included in a large amount, colorability and scratch resistance are decreased.

In addition, in the case of Comparative Example 5 in which a total content of the highly heat-resistant PMMA resin (d-1) and the high-fluidity PMMA resin (d-2) is small, scratch resistance and heat deflection temperature are decreased.

Further, it can be confirmed that, in the case of Comparative Example 6 in which the ASA graft copolymer (a) and the silicone-acrylate based copolymer (b) are included in a small amount, gray scale is decreased and thus weatherability is decreased.

What is claimed is:

1. A thermoplastic resin composition, comprising:
   7 to 50% by weight of an acrylic rubber-aromatic vinyl compound-vinyl cyan compound graft copolymer (a);
   7 to 40% by weight of a silicone-acrylate based copolymer (b);
   5 to 20% by weight of a (meth)acrylic acid alkyl ester compound-aromatic vinyl compound-vinyl cyan compound copolymer (c);
   30 to 75% by weight of a total (d) of a highly heat-resistant (meth)acrylic acid alkyl ester polymer (d-1) having a heat resistance of greater than 91° C. and a flow index (230° C., 3.8 kg) of 1 g/10 min to 5 g/10 min and a high-fluidity (meth)acrylic acid alkyl ester polymer (d-2) having a heat resistance of 91° C. or less and a flow index of greater than 5 g/10 minutes; and
   0 to 5% by weight of a (meth)acrylic acid alkyl ester compound-aromatic vinyl compound-acid anhydride copolymer (e).

2. The thermoplastic resin composition according to claim 1, wherein the graft copolymer (a) comprises an acrylic rubber-aromatic vinyl compound-vinyl cyan compound graft copolymer (a-1), in which the acrylic rubber has an average particle diameter of 500 to 2000 Å, and an acrylic rubber-aromatic vinyl compound-vinyl cyan compound graft copolymer (a-2), in which the acrylic rubber has an average particle diameter of 2500 to 6000 Å.

3. The thermoplastic resin composition according to claim 2, wherein the graft copolymer (a-1) is prepared by polymerizing 5 to 70% by weight of an acrylic rubber, 10 to 70% by weight of an aromatic vinyl compound, and 1 to 25% by weight of a vinyl cyan compound.

4. The thermoplastic resin composition according to claim 2, wherein the graft copolymer (a-2) is prepared by polymerizing 10 to 70% by weight of an acrylic rubber, 10 to 60% by weight of an aromatic vinyl compound, and 1 to 30% by weight of a vinyl cyanide compound.

5. The thermoplastic resin composition according to claim 2, wherein a weight ratio of the graft copolymer (a-1) : the graft copolymer (a-2) is 1:9 to 9:1.

6. The thermoplastic resin composition according to claim 1, wherein the silicone-acrylate based copolymer (b) is a copolymer formed by graft-polymerizing one or more selected from the group consisting of a silicone rubber, a silicone-acrylate based rubber, and a mixture thereof, which is used to prepare a core, with one or more selected from the group consisting of an aromatic vinyl compound, a vinyl cyan compound, and a (meth)acrylic acid alkyl ester compound, which is used to prepare a shell.

7. The thermoplastic resin composition according to claim 1, wherein the copolymer (c) is prepared by polymerizing 40 to 80% by weight of a (meth)acrylic acid alkyl ester compound, 10 to 40% by weight of an aromatic vinyl compound, and 1 to 20% by weight of a vinyl cyan compound.

8. The thermoplastic resin composition according to claim 1, wherein the polymer (d) is prepared by polymerizing acrylic acid alkyl ester or methacrylic acid alkyl ester.

9. The thermoplastic resin composition according to claim 1, wherein a weight ratio of the polymer (d-1) : the polymer (d-2) is 1:9 to 9:1.

10. The thermoplastic resin composition according to claim 1, wherein a weight ratio of the copolymer (c) to polymer (d) is 5~30:70~95.

11. The thermoplastic resin composition according to claim 1, wherein the copolymer (e) is prepared by polymerizing 15 to 30% by weight of a (meth)acrylic acid alkyl ester compound, 60 to 80% by weight of an aromatic vinyl compound, and 1 to 15% by weight of an acid anhydride.

12. The thermoplastic resin composition according to claim 1, wherein the thermoplastic resin composition comprises 0.1 to 5 parts by weight of a siloxane-polyester copolymer (f) based on 100 parts by weight of the thermoplastic resin composition.

13. The thermoplastic resin composition according to claim 1, wherein the thermoplastic resin composition further comprises one or more selected from the group consisting of an antimicrobial agent, a heat stabilizer, an antioxidant, a releasing agent, a light stabilizer, an inorganic additive, a surfactant, a coupling agent, a plasticizer, a compatibilizer, a lubricant, an antistatic agent, a colorant, a pigment, a dye, a flame retardant, an auxiliary flame retardant, an anti-dripping agent, a weathering-resistant agent, an ultraviolet absorber, and a sunscreen.

14. The thermoplastic resin composition according to claim 1, wherein the thermoplastic resin composition has a scratch resistance value, $\Delta L$ (brightness by color system CIE1976 $L^*a^*b$), of 2 or less.

15. The thermoplastic resin composition according to claim 1, wherein the thermoplastic resin composition has a heat deflection temperature of 82° C. or more.

16. The thermoplastic resin composition according to claim 1, wherein the thermoplastic resin composition may have a flow index (220° C., 10 kg) of 6 or more according to ASTM D1238.

17. The thermoplastic resin composition according to claim 1, wherein the thermoplastic resin composition has a weatherability of grade 4 or higher more according to gray scale for evaluating change in color.

18. A method of preparing a thermoplastic resin composition, the method comprising: a step of melt-kneading 7 to 50% by weight of an acrylic rubber-aromatic vinyl compound-vinyl cyan compound graft copolymer (a); 7 to 40% by weight of a silicone-acrylate based copolymer (b); 5 to 20% by weight of a (meth)acrylic acid alkyl ester compound-aromatic vinyl compound-vinyl cyan compound copolymer (c); 30 to 75% by weight of a total (d) of a highly heat-resistant (meth)acrylic acid alkyl ester polymer (d-1) having a heat resistance of greater than 91° C. and a flow index (230° C., 3.8 kg) of 1 g/10 min to 5 g/10 min and a high-fluidity (meth)acrylic acid alkyl ester polymer (d-2) having a heat resistance of 91° C. or less and a flow index of greater than 5 g/10 minutes; and 0 to 5% by weight of a (meth)acrylic acid alkyl ester compound-aromatic vinyl compound-acid anhydride copolymer (e), followed by extrusion.

19. A molded article manufactured from the thermoplastic resin composition according to claim 1.

* * * * *